UNITED STATES PATENT OFFICE.

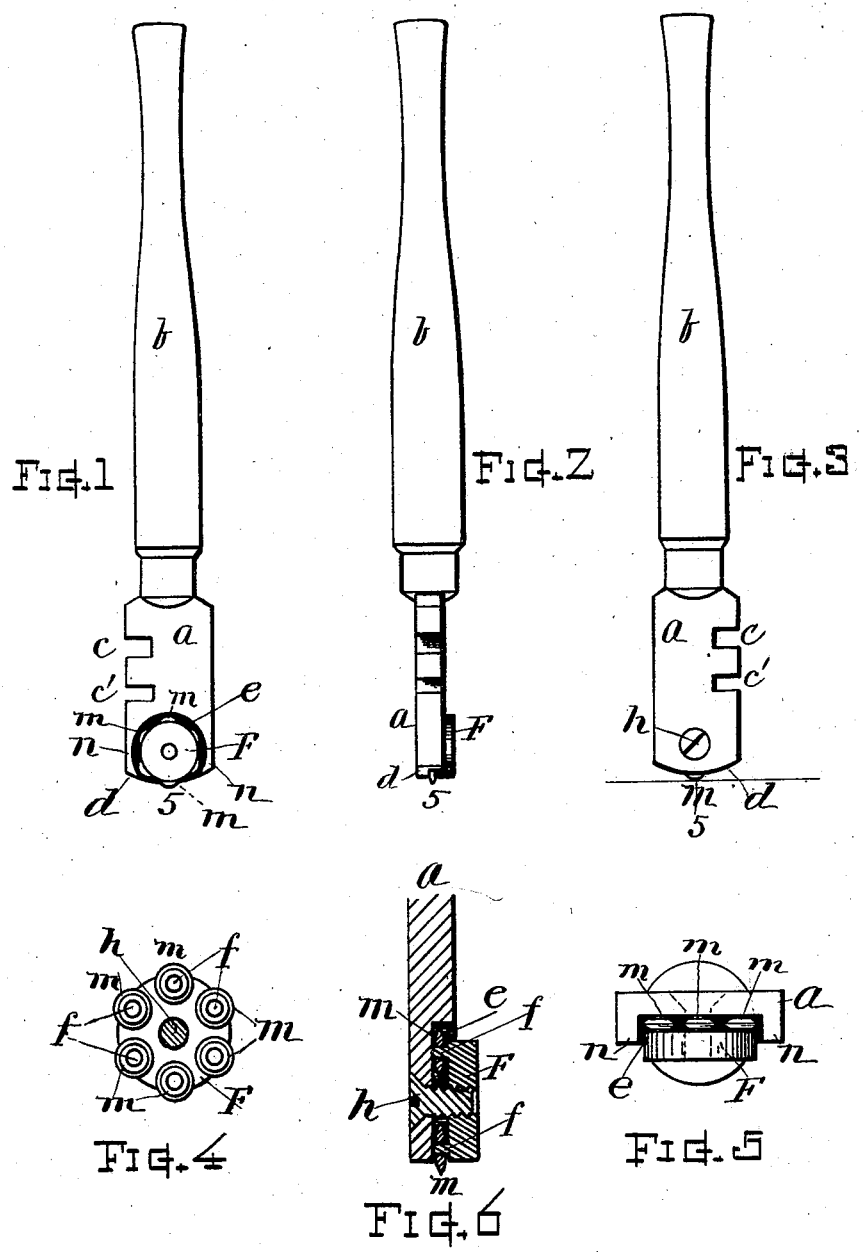

ALBERT D. GOODELL, OF SHELBURNE FALLS, MASSACHUSETTS.

GLASS-CUTTER.

SPECIFICATION forming part of Letters Patent No. 557,200, dated March 31, 1896.

Application filed November 9, 1895. Serial No. 568,455. (No model.)

*To all whom it may concern:*

Be it known that I, ALBERT D. GOODELL, a citizen of the United States, residing at Shelburne Falls, in the county of Franklin and State of Massachusetts, have invented a new and useful Glass-Cutter, of which the following, together with the accompanying drawings, is a specification sufficiently full, clear, and exact to enable persons skilled in the art to which this invention appertains to make and use the same.

The object of my present invention is to provide a glass-cutting tool with a series of cutting-wheels arranged in such manner that any one of the several cutting-wheels may be quickly set ready for use, while the others are left well protected.

Another object is to provide a steel-wheel glass-cutting tool with a series of steel cutting-wheels and means for connecting said wheels with the handle-head in a manner adapted for the convenient removal and replacement of the cutting-wheels when damaged or worn out.

These objects I attain by the glass-cutting tool constructed in the peculiar manner herein illustrated and described.

In the drawings, Figure 1 is a side view of a glass-cutter embodying my invention. Fig. 2 is an edge view. Fig. 3 is an opposite side view. Fig. 4 is a view of the inner side of the adjustable circular disk or block carrying the cutter-journal or axis-pins. Fig. 5 is an end or face view; and Fig. 6 is a transverse vertical section through the lower end of the body and block. Figs. 4, 5, and 6 are drawn to an enlarged scale.

My improved article of manufacture consists of a hand tool or instrument, such as shown, and consisting of the flat metal body $a$ having at one end a suitable handle $b$ and preferably provided on its edge with the usual notches $c$ $c'$. The lower end of the body is rounded, as at $d$, and upon one of its sides is formed a circular recess $e$, that extends through the curved lower end face, as indicated.

F indicates a circular block or disk having a central threaded opening and provided near its periphery with a series of six (more or less) short pins or journals $f$, that project laterally from the side of the disk axially parallel with each other, and upon said pins are mounted the small bevel-edged steel cutter-wheels $m$, one upon each of the respective pins. This circular block is arranged within the recess or cavity $e$ with the ends of the pins $f$ resting against the side of the body, the lower edge of the block even with the end $d$ thereof, and is there adjustably but firmly secured to the body $a$ by a screw $h$, that passes through the same and draws the parts together with a clamping action against the ends of the pins, the cutter-wheels $m$ being thus confined to run loosely on the journals or pins $f$ between the adjacent sides of the block and body, one of said cutter-wheels projecting from the curved end face in proper working position, as at 5, while the other cutter-wheels of the series occupy positions within the recess $e$ and are protected by the surrounding flange or shoulder $n$, so that they cannot come in contact with any external objects.

In assembling the parts the cutter-wheels $m$ are first slipped onto the pins $f$, and the block is then attached to the body by its screw $h$. By slightly loosening the screw and turning the block F any one of the series of cutter-wheels can at any time be quickly set at working position. When it is desired to replace worn-out cutters, the block can be removed from the body, the cutters removed from the pins and new cutters placed thereon, and the block then resecured in position. Thus I provide an improved instrument in which any or all of the cutters can be easily replaced at small expense.

By means of the recess in the body a sure protection is afforded for the cutter-wheels, which if exposed might become nicked by contact with some hard substance. It is obvious, however, that the tool might in some instances be made without forming the recess in the side of the body, the block being attached in similar manner to the flat side of the body; but I prefer to make it with its side recessed, as shown.

I claim as my invention and desire to secure by Letters Patent—

1. In a glass-cutter, in combination with the handle and body portion having notches in the edge thereof; the circular block carrying, near its peripheral edge, a series of laterally-projecting pins fixed therein; and a series of edged cutting-wheels respectively mounted on said pins; said block adjustably attached by a central screw to the side of the lower part of said body portion, with the ends of said pins resting against the side thereof, and the cutting-wheels confined for rotation between the adjacent surfaces of the body and block, as set forth.

2. The within-described glass-cutting tool, comprising the body portion having a suitable handle, said body formed with a circular recess in one side at its lower end, and the circular block provided near its periphery with a series of laterally-projecting pins or journals, said block adjustably secured within the recess to the side of the body by the central screw or stud, and the series of bevel-edged cutter-wheels mounted upon the respective journal-pins and supported between said block and body portions, with one of said cutter-wheels projecting at the lower curved end of the body.

Witness my hand this 6th day of November, A. D. 1895.

ALBERT D. GOODELL.

Witnesses:
HARRIETT E. GOODELL,
A. K. HAWKS.